US007269565B2

(12) United States Patent
Asano et al.

(10) Patent No.: US 7,269,565 B2
(45) Date of Patent: Sep. 11, 2007

(54) STORAGE OPERATIONAL SYSTEM AND METHOD OF PROVIDING THE STORAGE RENTAL SERVICE

(75) Inventors: Masayasu Asano, Yokohama (JP); Ken'ichi Soejima, Yokohama (JP); Satoshi Miyazaki, Yamato (JP)

(73) Assignee: Hitachi, Ltd., Tokyo (JP)

( * ) Notice: Subject to any disclaimer, the term of this patent is extended or adjusted under 35 U.S.C. 154(b) by 1241 days.

(21) Appl. No.: 10/078,350

(22) Filed: Feb. 21, 2002

(65) Prior Publication Data
US 2003/0131165 A1 Jul. 10, 2003

(30) Foreign Application Priority Data
Jan. 9, 2002 (JP) ............................. 2002-002036

(51) Int. Cl.
*G06Q 99/00* (2006.01)
(52) U.S. Cl. ....................................................... 705/1
(58) Field of Classification Search .................... 705/1, 705/14
See application file for complete search history.

(56) References Cited
U.S. PATENT DOCUMENTS
6,067,525 A * 5/2000 Johnson et al. ............... 705/10
2002/0152133 A1 * 10/2002 King et al. .................... 705/26

FOREIGN PATENT DOCUMENTS
JP 04-077861 3/1992
JP 11-212930 * 8/1999
JP 11-259319 9/1999
JP 2001-014021 1/2001

OTHER PUBLICATIONS
Carino et al. article "The Data management Service Provider", 2001, FileTek, Inc.*
Nikkei System Provider, Mar. 16, 2001, "SSPs Supporting the Service Industry".
Ryota Tamaoki, "taitousuru 'storage service provider' disk wo net de jikangashi", Nikkei Computer, Nikkei Business Publications, Inc., No. 526, Jul. 16, 2001, pp. 30-32. (Discussed in English translation of foreign Office Action).

* cited by examiner

*Primary Examiner*—Naresh Vig
(74) *Attorney, Agent, or Firm*—Mattingly, Stanger, Malur, & Brundidge, P.C.

(57) ABSTRACT

It is desirable that using a computer system, which administrates multiple storages, the storages are operated efficiently to minimize free spaces on the storages by assigning effectively the free spaces to the users with a wide variety of needs, resulting in their higher satisfaction.

To achieve this, the storage operational system allows the SSPs to create and present the next-best proposed set-ups satisfying partially the users' requirements even if all the requirements are not satisfied by the proposed set-ups created based on the requirements for set-ups by the users assigned to rented storages. In addition, to satisfy the users' requirements as possible, such conditions as application of discounted prices can be indicated to other users for negotiation provided that the user's requirements may be satisfied by changing the conditions for using the storages through such a negotiation with other users.

2 Claims, 11 Drawing Sheets

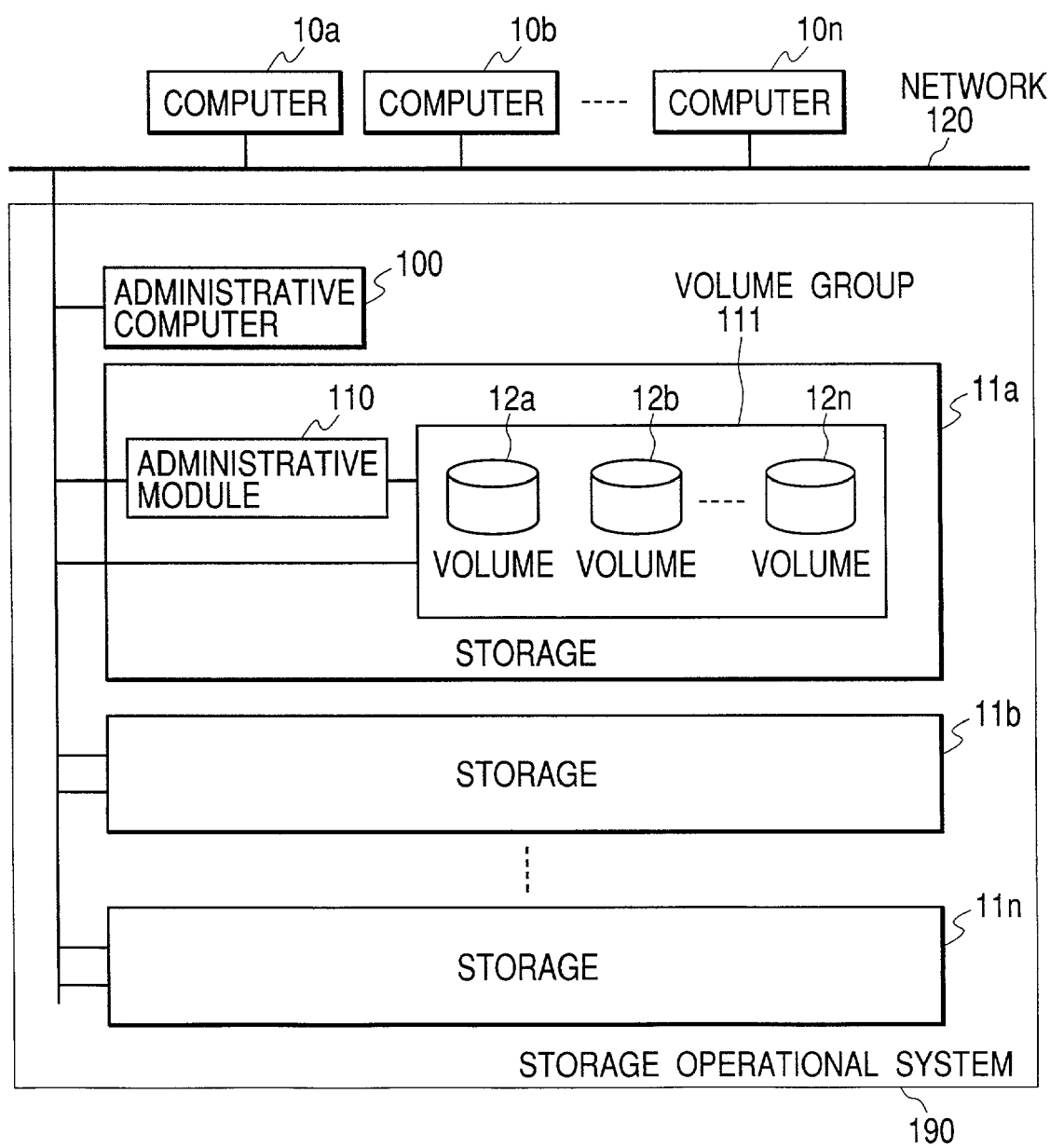

FIG. 2

200 : STORAGE INFORMATION TABLE

| STORAGE ID | TOTAL CAPACITY | FREE CAPACITY | STANDARD PERFORMANCE | STANDARD PRICE (1.0M/G) | MAX. PERFORMANCE AVAILABLE |
|---|---|---|---|---|---|
| 1 | 1T | 500G | A | ¥100 | B |
| 2 | 100G | 80G | B | ¥50 | B |
| 3 | 100G | 5G | B | ¥50 | B |

210 : VOLUME INFORMATION TABLE

| VOLUME ID | CAPACITY | USER | COMPUTER NAME | PERFORMANCE GUARANTEE | CURRENT PERFORMANCE |
|---|---|---|---|---|---|
| 1 | 300G | TARO | TARO | YES | A |
| 2 | 100G | TARO | TARO | NO | B |
| 3 | 100G | JIRO | JIRO | NO | B |

220 : STORAGE PRICE ADJUSTMENT TABLE

| STANDARD PERFORMANCE | DETERIORATED PERFORMANCE | DISCOUNT RATE |
|---|---|---|
| A | B | 50% |
| A | C | 70% |
| B | C | 30% |

230 : STORAGE PERFORMANCE DEFINITION TABLE

| PERFORMANCE | ACCESS TIME | RELIABILITY | ... |
|---|---|---|---|
| A | LESS THAN 20ms | HIGH | |
| B | FROM 20ms TO LESS THAN 40ms | MEDIUM | |
| C | 40ms OR MORE | LOW | |

240 : STORAGE PERFORMANCE GUARANTEE PRICE TABLE

| PERFORMANCE | PERFORMANCE GUARANTEE PRICE |
|---|---|
| A | STANDARD PRICE×2 |
| B | STANDARD PRICE×1.5 |

FIG. 3

510: PROPOSED STORAGE SET-UP TABLE

| ENTRY ID (511) | PERFORMANCE (512) | CAPACITY (513) | PRICE (514) | NEGOTIATION WITH OTHER USER (515) | COMPARISON WITH REQUIREMENT (516) | SELECT FLAG (517) |
|---|---|---|---|---|---|---|
| 1 | B | 100G | ¥5,000 | NOT REQUIRED | PERFORMANCE (A→B) | ○ |
| 2 | A (PERFORMANCE GUARANTEE) | 100G | ¥20,000 | REQUIRED | | ○ |

800: STORAGE SET-UP CHANGE TABLE

| CHANGES (801) | DISCOUNT /MONTH (802) | RULES (803) |
|---|---|---|
| RELOCATION | −¥30 | ONLY THE SAME STORAGE |
| CAPACITY | −¥100 | ±25% OF CAPACITY |
| PERFORMANCE | −¥150 | 1 RANK UP/DOWN, PERFORMANCE GUARANTEE ASSURED |

910: STORAGE CHANGE REQUEST TABLE

| ENTRY ID (911) | CAPACITY (912) | PERFORMANCE (913) | PRICE (914) | RELOCATION (915) | DISCOUNT /MONTH (916) | SELECT FLAG (917) |
|---|---|---|---|---|---|---|
| 1 | 100G→50G | B (NOT CHANGED) | ¥5,000→ ¥2,500 | YES | −¥130 | ○ |
| 2 | 100G (NOT CHANGED) | A (PERFORMANCE GUARANTEE) B (PERFORMANCE GUARANTEE) | ¥20,000→ ¥7,500 | NO | −¥150 | ○ |

"SET STORAGE" SCREEN

- PERFORMANCE : A — 401
- PERFORMANCE GUARANTEE : YES — 402
- CAPACITY : 100G — 403
- SET-UP — 404

400

| ENTRY ID | PERFORMANCE | CAPACITY | PRICE | NEGOTIATION WITH OTHER USER | COMPARISON WITH REQUIREMENT | SELECT BUTTON |
|---|---|---|---|---|---|---|
| 1 | B | 100G | ¥5,000 | NOT REQUIRED | PERFORMANCE (A→B) | ○ |
| 2 | A (PERFORMANCE GUARANTEE) | 100G | ¥20,000 | REQUIRED | | ○ |

1511  1512  1513  1514  1515  1516  1517

CONFIRM 518    CANCEL 519

"PROPOSED STORAGE SET-UP" MENU

| ENTRY ID | CAPACITY | PERFORMANCE | PRICE | RELOCATION | DISCOUNT /MONTH | SELECT BUTTON |
|---|---|---|---|---|---|---|
| 1 | 100G→50G | B (NOT CHANGED) | ¥5,000→ ¥2,500 | YES | −¥130 | ○ |
| 2 | 100G (NOT CHANGED) | A (PERFORMANCE GUARANTEE) B (PERFORMANCE GUARANTEE) | ¥20,000→ ¥7,500 | NO | −¥150 | ○ |

"STORAGE CHANGE REQUEST" MENU

CONFIRM 918   RESET 919   REJECT 920

FIG. 12

1210 : STORAGE PRESENTATION TABLE

| PRODUCT NAME | PERFORMANCE | CAPACITY AVAILABLE | PRICE | REMARKS | SELECT FLAG |
|---|---|---|---|---|---|
| PRODUCT 1 | A (GUARANTEE) | 20G | ¥2,000 | | ○ |
| PRODUCT 2 | B (STANDARD A) | 40G | ¥2,000 | B PRICE REMAINS FOR ONE MONTH EVEN IF UPGRADED TO A | ○ |
| PRODUCT 3 | B | 10-50G (IN 10G STEP) | ¥500(10G) | | ○ |
| PRODUCT 4 | C | 10-50G (IN 10G STEP) | ¥100(10G) | 50% DISCOUNT FROM SERVICE PRICE | ○ |

Columns: 1211, 1212, 1213, 1214, 1215, 1216

| PRODUCT NAME | PERFORMANCE | CAPACITY AVAILABLE | PRICE | REMARKS | SELECT FLAG |
|---|---|---|---|---|---|
| PRODUCT 1 | A (GUARANTEE) | 20G | ¥2,000 | | ○ |
| PRODUCT 2 | B (STANDARD A) | 40G | ¥2,000 | B PRICE REMAINS FOR ONE MONTH EVEN IF UPGRADED TO A | ○ |
| PRODUCT 3 | B | 10-50G (IN 10G STEP) | ¥500(10G) | | ○ |
| PRODUCT 4 | C | 10-50G (IN 10G STEP) | ¥100(10G) | 50% DISCOUNT FROM SERVICE PRICE | ○ |

Columns: 2211, 2212, 2213, 2214, 2215, 2216

SET-UP

"STORAGE PRESENTATION" MENU  2217

STORAGE OPERATIONAL SYSTEM AND METHOD OF PROVIDING THE STORAGE RENTAL SERVICE

BACKGROUND OF THE INVENTION

1. Field of the Invention

The present invention relates to a storage operational system and a method of providing a storage rental service and especially, relates to the storage operational system, which allows storage service providers to efficiently operate the system to meet the customers' requests and the method of providing the storage rental service, which allow the storage service providers to provide appropriate storage rental services matching for their charges to users for improving users' satisfaction.

2. Description of the Related Art

In computer systems being operated and administered by enterprises, as the amount of data stored in the storage device (hereafter, simply referred to as a storage) has increased, administration works has became complicated with higher costs. Under such a situation, as one of measures to solve involved problems, out of various computing-related jobs in the enterprises, a storage administration job may be consigned to storage service providers (hereafter, simply referred to as SSP), who are surrogate companies.

Usually, the SSP has one or more storages and splits them into partitioned areas to rent to multiple users. The user pays a rental fee for his/her own storage area assigned and the SSP provides to him/her an administrative service for the assigned storage area. This administrative system allows the user, who stores his/her data in the rented storage area, to save the cost for data management (see the article "SSPs Supporting the Service Industry", Nikkei System Provider, Mar. 16, 2001).

The above-mentioned storage administrative service provided by the SSP may create a promising business market because it has an advantage in that the user can use a higher reliable storage for a reasonable cost without having a large-scale storage system.

The problem to be solved by the SSP lies in that he/her must earn profits as large as possible from the service business to achieve a high return on investment while making full use of its own storage to give the user satisfaction.

However, under the present situation, such a requirement is difficult to be satisfied that the SSP uses its storage efficiently while meeting the user's needs.

For example, some cash-rich users may want to have a large-capacity, high performance storage area assigned even if they pay a higher cost while others may want to make a service contract for a low cost even if a small capacity, low-performance storage area is assigned.

Taking these users' needs into account, the SSP should present different service conditions and fees specific to individual users. In the present circumstances, however, it is sometimes impossible that the service conditions and fees, which satisfy the users' needs, are indicated. In this case, the user, to whom no service is offered, is thrown into despair and the SSP may throw away an opportunity for business despite the existence of the user, who wants to use the storage service.

On the other hand, it is expected that practically, in many cases, the storage can be used with no problem even if all the users' needs are not always satisfies.

In addition, it should be considered that the user's needs are always volatile and not fixed. For example, some users required a large capacity of storage area at one time and a less capacity of storage area at present. In this case, a decrease in cost is the users' benefit while it is the SSP's benefit to make a service contract with others, who want to use those storage areas. In such a situation, it is difficult for the SSP to assign the storage areas to the users properly under the conditions of the conventional storage service.

Even if the SSP accepts the users' needs and provides the service satisfying them, not only efficient use of the system cannot be achieved but also the users are forced to spend unfruitful time and effort. For example, if the storage areas not used are provided for lower prices, the users stand to gain in cost saving while the SSP may use the storage system effectively.

An object of the present invention, which is intended to solve the problems mentioned above, is to provide the storage operational system and the method of providing the storage rental service, which satisfy a wide variety of users' needs to improve the users' satisfaction and allows the SSP to operate its own storage system efficiently while coping with any change in use for storage.

BRIEF SUMMARY OF THE INVENTION

To achieve the above-mentioned purpose, the present invention allows to the PPS to present a proposed, next-best storage set-up, which satisfy the users' requirements to a considerable extent but not perfectly, if they request the storage set-up.

An administrative computer, which manages usage of storages, always keeps track of the usage by monitoring the storages at any time. In creating the proposed storage set-up, if the storage set-up, which satisfies the requirements by the user requesting the storage set-up, can be created by changing an existing user's storage set-up, the SSP proposes that storage set-up to the user. If the user requests a new set-up and the user's requirements are satisfied by changing the existing user's use conditions, the SSP presents the proposed set-up for changing use conditions. If the existing user agrees with a change of conditions based on the proposed set-up, the SSP informs to the user requesting the storage set-up that the storage area can be configured based on the created set-up. The SSP applies a discount to the existing user, who agreed with the change, in return.

Thus, the SSP can extract a useful storage set-up for the user requesting storage set-up based on current storage usage. This gives many chances for setting the storage area, promoting storage configuration. Free areas of the storages administered by the SSP can be minimized if users' storage areas may be frequently re-configured, achieving effective storage operation by the SSP.

According to the present invention, to minimize the free areas of the storages for effective operation, the free storage areas and their prices may be disclosed as service products and presented to the users at any time. Therefore, the SSP's sales promotion of service products is encouraged.

BRIEF DESCRIPTION OF SEVERAL VIEWS OF DRAWING

FIG. 1 is a view showing a configuration of a storage operational system according to the present invention.

FIG. 2 is a view (part 1) showing the table formats of tables used in the storage operational system according to the present invention.

FIG. 3 is a view (part 2) showing the table formats of tables used in the storage operational system according to the present invention.

FIG. 10 is a schematic drawing showing a "Storage Change Request" menu.

FIG. 12 is a schematic drawing showing a structure of a Storage Presentation Table.

FIG. 13 is a schematic drawing showing a Storage Presentation Menu.

DETAILED DESCRIPTION OF THE INVENTION

Figure 4:
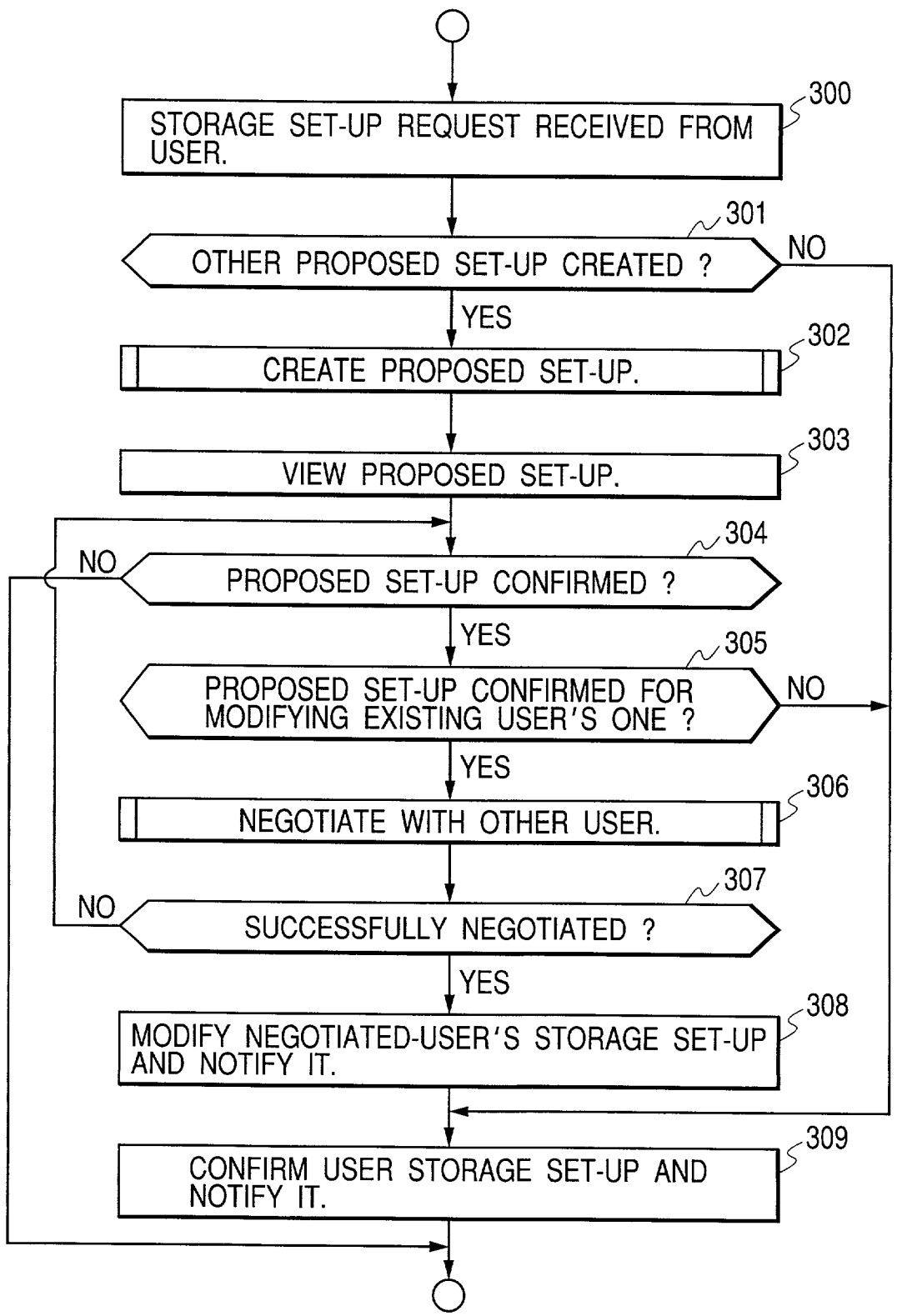
FIG. 4 is a general flowchart showing a sequence of procedural steps starting from "storage set-up request receive by user" until completion of storage assignment.

Embodiments of the present invention are described below based on FIG. 1-FIG. 13.

EMBODIMENT 1

A first embodiment of the prevent invention is described below based on FIG. 1-FIG. 10.

(I) Configuration of a Storage Operational System

First, the configuration of the storage operational system of the prevent invention is described based on FIG. 1.

FIG. 1 is a view showing the configuration of the storage operational system of the present invention.

An administrative computer 100 is the computer, which manages the usages of storages 11a, 11b, . . . , 11n.

Computers 10a, 10b, . . . , 10n are the computers, which can use any storages 11a, 11b, . . . , 11n.

Storage 11a consists of an administrative module 110, which administers and controls storage 11a and enables it to communicate with a network 120 connecting between the computers and storages, and a storage volume group 111.

The administrative module 110 is the module, which administers and controls storage 11a and enables it to communicate with a network 120 connecting between the computers and storages. The volume group 111 is a set of volumes, which is a smallest unit of storage provided to the users, and consists of volumes 12a, 12b, . . . , 12n, into or from which data transferred from the computers 10a, 10b, . . . , 10n are written or read through the network 120. Other storages 11b, . . . , 11n have a configuration similar to the storage 11a.

The network 120 may have use fibre channels and Ethernet (a registered trade mark) connected or may be configured independent of the fibre channels and Ethernet. In this case, multiple communications devices may be installed in the administrative computer 100, the computers 10a, 10b, . . . , 10n, and the storages 11a, 11b, . . . , 11n depending on the type of used cables.

Assuming that a storage operational system 190 shown in FIG. 1 is a system operated by the SSP, the computers 10a, 10b, . . . , 10n are a customer's server for the SSP and the storages 11a, 11b, . . . , 11n are the storages, each volume in which is priced and provided to the customers by the SSP. One or more of the volumes 12a, 12b, . . . , 12n form one unit of storage provided to the customers by the SSP. The administrative computer 100 is the computer, which manages information necessary for operating the SSP's storage system.

(II) Formats of the Tables Used in the Storage Operational System

Second, table formats of the tables used to the storage operational system of the present invention are described based on FIG. 2 and FIG. 3.

FIG. 2 and FIG. 3 are views showing the table formats of the tables used in the storage operating system of the present invention.

These tables contain information on the storages controlled by the storage operational system 190 and reflect current status of storage operation.

A Storage Information Table 200 shown in FIG. 2 the table, which is intended to contain storage information on the storages 11a, 11b, . . . , 11n. The Storage Information Table 200 contains a storage ID added to identify each storage, its total capacity 202, a free storage space 203, a standard performance 204 achieved when the storages are used in its normal manner, a standard price 205 presented to the customers by the SSP, and a maximum performance currently available 206 indicating the maximum performance currently achieved by the storages. The total storage capacity 202 varies depending on an increase or decrease in volume capacity in the storages and the free storage space 203 is determined by volume capacities assigned to the customers by the SSP. The standard performance 204 is a unit differentiated considering a total aspect of performances such as access time velocities and reliability levels of the storages. Here, A is the highest performance storage, B is the one lower-ranked storage, and C is the two lower-ranked storage, and so on. The standard price 205 is established by the SSP and any change in the standard prices is reflected in the storage service prices presented to the customers. The maximum performance currently available 206 is the performance, which can be achieved when a new volume set-up is applied under administrative control of an administrative module 110.

A Volume Information Table 210 is the table used to manage the volume information on the volumes installed in individual storages. For this reason, the same number of Volume Information Tables 210 should exist as that of the storage IDs registered in the Storage Information Table 200.

In this case, the Volume Information Table 210 shown in FIG. 2 should contain the information on the storage with the storage ID, 1. The Volume Information Table 210 contains a volume ID 21 added to identify each volume, its volume capacity 212, the name of a user using each volume 213, the name of a computer 214 actually used by the volume user name 213, performance guarantee 215, in which a yes or no value is specified to indicate whether performance guarantee should be applied to that volume, and information on current volume performance 216.

Depending on the yes or no value in performance guarantee 215, volume performance is adjusted in the administrative module 110. Values stored in the name of the computer 214 are identifications of computers 10a, 10b, . . . , 10n.

A Storage Price Adjustment Table 220 is the table used to reference as a base when the SSP apply a discount in case of deterioration in said storage performance in use. The standard performance 221 is registered by a customer at storage set-up when the SSP makes a storage service contact with the customer and if any deterioration is detected in the storage, a discount rate 223, which compensates for deteriorated performance, is set. For example, the performance set by the customer A has deteriorated to B while the customer was using the storage. In such a case, the SSP provides its storage service to said customer for a 40%-discounted price. The Storage Price Adjustment Table 220, which allows the SSP to set the prices at higher flexibility depending on current status of storage performance, provides information useful to force the customers to be willing to continue the storage service contact even if any deterioration occurs in storage performance.

A Storage Performance Definition Table 230 is the table used to list storage performances, rank uniformly and define them.

The Storage Performance definition Table 230 allows to the SSP to uniformly evaluate storage performances by describing parameters such as a storage access time 232 and a storage reliability 233 with respect to each performance 231.

A Storage Performance Guarantee Price Table 240 is the table used to determine the price of the storage service with performance guarantee added at storage set-up. With respect to each performance 241, a means for setting the price applied when performance guarantee is added is specified in the Storage Performance Guarantee Price Definition 242. For example, setting to twice the standard price indicates twice the price for the storage service with no performance guarantee added.

Subsequently, a Proposed Storage Set-up Table 510 is the table, which contains a proposed storage set-up created by the system to present to the user. The Proposed Storage Set-up Table 510 includes fields, a performance 512, a capacity 513, a price 514, a negotiation with other user 515, a comparison with requirement 516, and a select flag 517 with respect to each entry ID 511.

The performance 512 and the capacity 513 field specify the performance and capacity specifications of the storage provided to the user by the system. In addition, the performance 512 field contains the yes or no value for application of performance guarantee.

The price 514 field contains the price of the storage service provided to the user.

The negotiation with other user 515 field contains a flag indicating whether or not a negotiation with other user is needed for implementation of the proposed set-up. When the user selects the proposed set-up requiring the negotiation with other user, the user should select another proposed entry set-up or issues a request for the proposed set-up to the system because the proposed set-up cannot be implemented if the negotiation is not established. This field also contains the result of checking to see if the negotiation with other user was successfully established. The details about a procedure for the negotiation with other user and its process are described later.

A comparison with requirement 516 descriptive field contains information indicating the result of the comparison with the proposed set-up requested by the user. One of characteristics of the storage operational system of the present invention is in that it creates and presents a next-best proposed set-up even if all the user's requirements of the proposed set-up are not satisfied. This field has an implication that the system compares the proposed set-up created by itself with the requirements by the user for explanation to obtain the user's agreement. In this example, with respect to the entry ID 1, the performance requested by the user is A while B in the proposed set-up.

A select flag 517 indicates whether or not the user has selected this entry.

Subsequently, a Storage Set-up Change Table 800 is the table used as a norm for modifying the proposed set-up when the system is required to negotiate with other user and consists of fields, changes 801, a discount/month 802, and rules 803.

As shown in FIG. 3, changes 801 is comprised of fields, "relocation", "capacity", and "performance". The discount/month 802 specifies a discounted price, which compensates for user's modification, of which scale may be large or small depending on the setting in the changes field.

A rules 803 contains the conditions for modification by the user. For example, if the changes field 801 contains "relocation", the setting "only the same storage" indicates that the storage should be changed only to another storage of the same type when necessary. The changes field 801 contains "capacity", the setting "±25% of capacity" indicates that 25% or more of an original capacity should not be exceeded, if changed. In addition, the field contains "performance", the setting "1 rank up/down, performance guarantee assured" indicates that the performance may be changed by only one rank up or down and should not be exceed, while the performance should not be changed if the user's storage is performance-guaranteed.

Even with the same changes, several levels of rules may be created to make differences among prices.

Subsequently, a Storage Change Request Table 910 is the table used to contain the proposed set-up presented at negotiation with the user.

The Storage Change Request Table 910 is comprised of fields, capacity 912, performance 913, price 914, relocation 915 specifying a yes or no value, discount/month 916, and select flag 917 with respect to each entry 911.

The capacity 912 and the performance 913 fields contain performance and capacity levels between before and after the change for easy comparison. The discount/month 914 field contains the price modified due to changes in performance and capacity compared with that before the changes. The relocation 915 field, which specifies a yes or no value for relocation, sets a flag indicating whether or not a change is made to the storage containing the user's data.

A discount/mouth 916 field contains the discount price determined base on the Storage Set-up Change Table 800.

For this reason, the user will pay the changed price indicated in the price 914 field taking the discount price into account if accepting the changed, proposed set-up.

A select flag 917 sets the flag indicating whether or not the user accepts the changed, proposed set-up and selects the entry.

By reference with these various tables shown in FIG. 2 and FIG. 3, the administrative computer 100 can grasp the current usage of the storages 11a, 11b, ..., 11n managed by the SSP's system and extracted data can be used for storage set-up and change. Moreover, the SSP can make full use of this information to present the prices for the storages 11a, 11b, ..., 11n, which has been changed depending on the volume usage.

(III) How the Storage Operational System Works

Next, how the storage operational system of the present invention works is described based on FIG. 4-FIG. 10.

Figures 5, 6:
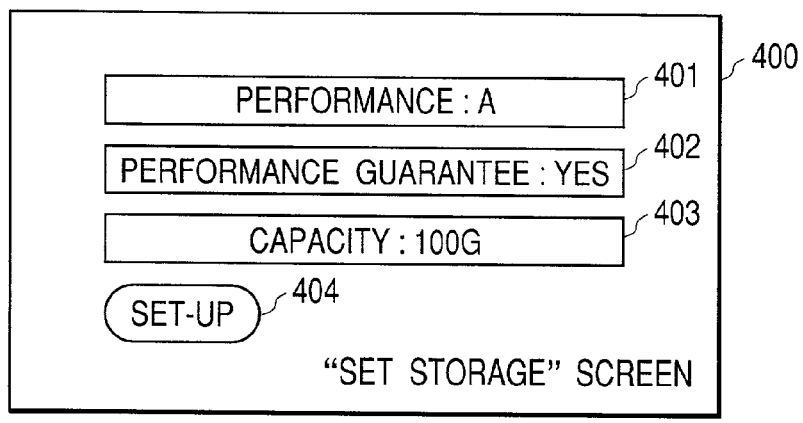
FIG. 5 is a schematic diagram showing a "Set Storage" screen.
FIG. 6 is a schematic drawing showing a "Proposed Storage Set-up" menu.
Figure 7:
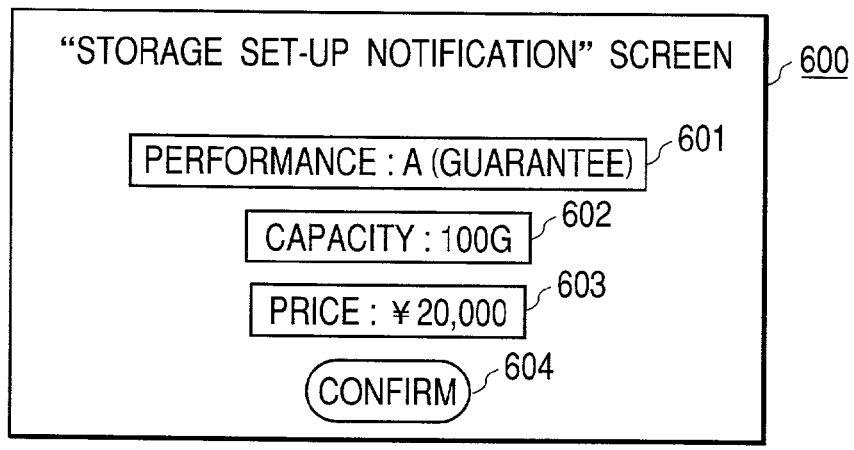
FIG. 7 is a schematic drawing showing a "Storage Set-up notification" screen.

(III-1) Outline of Procedure from Storage Set-Up Request to End of Storage Set-Up First, following the flowchart shown in FIG. 4, the process is explained starting from the user requests storage set-up to the SSP until storage set-up is complete based on FIG. 5-FIG. 7.

FIG. 4 is a general flowchart showing the procedure starting from storage set-up request issued to the SSP by the user to the completion of storage set-up.

FIG. 5 is a schematic drawing showing a "Storage Set-up" Screen.

FIG. 6 is a schematic drawing showing a "Proposed Storage Set-up" Menu.

FIG. 7 is a schematic drawing showing "Storage Notification" Screen.

This screen indicates the result of assignment of the storage area by the administrative computer 100 of the storage operational system 190 to the user in response to the user's request for configuring any volume in the storages 11a, 11b, . . . , 11n.

At that time, in response to the customer's request for configuring any volume of the storages 11a, 11b, . . . , 11n, the SSP will assign the volume to the user and presents the result. In the following descriptions of embodiments, the word "the SSP's customer" may be considered to be interchangeable with the word "the user".

The administrative computer 100 shown in FIG. 1 presents the "Storage Set-up" Screen 400 shown in FIG. 5 to the user requesting storage set-up and accepts the requirements for storage set-up from the user (step 300).

At this time, to protect security, a procedure may be added for displaying the menus only after a user's password is verified.

In the "Storage Set-up" Screen 400 of FIG. 5, the performance 401, performance guarantee 402, and capacity 403 specify the requested performance, a yes or no value for application of performance guarantee, and the capacity requested by the user, respectively.

In the example shown in the figure, "A", "yes", and "100G", values have been entered in the performance 401, performance guarantee 402, and capacity 403 fields.

To transfer entered data to the administrative computer 100 of the storage operational system, the user clicks the "Set" button 404 by the mouse for selection.

To set entered data, the user may use any of his/her own computer or a shared computer.

This example assumes that it is required that only performance, performance guarantee, and capacity be changed for easy understanding.

In this case, the maximum capacity, which can be set by the user, may be viewed on another display screen or this set-up screen 400. In addition, the price may be viewed with respect to each level of performance.

For example, in the example data shown in FIG. 2, the maximum capacities of the storages with performances A and B are 1T and 100G, respectively. The prices of 1G storages with performances A and B are ¥100 and ¥50.

After data for storage set-up request has been entered, it is determined whether or not any other proposed set-up should be created (step 301).

If possible, the system implements the user's storage set-up satisfying the requirements by the user and then informs the user of the completion of the set-up process (step 309).

Here, the context "in case that any other proposed set-up should be created" means when only the next-best proposed set-up satisfying partially the user's requirements can be implemented instead of the proposed set-up satisfying all the user's requirements in current system status, or when the system requirements should be changed by making negotiation with other user.

It may be determined by the administrative computer 100 of the storage operational system or may be selected by the user whether or not any other proposed set-up data should be created. For example, if the administrative computer 100 determines whether or not any other set-up data should be created, the Storage Information Table 200 and the Volume Information Table 210 is checked for any storage satisfying the user's requirements, and if not found, other proposed set-up is created.

It is assumed that as shown in FIG. 5, the user's requirements are entered in the Storage Setup Screen 400. In this case, with respect to the storage with performance A, the administrative computer 100 searches the standard performance 205 fields in the Storage Information Table shown in FIG. 2 for the entry with storage ID 1. Since the free space of this storage is 500G while the capacity required in the performance 403 by the user is 100G, the set-up may be acceptable. For this reason, at this point, the set-up has passed the comparison-test against the Storage Information Table 200.

The Storage Information Table 200 indicates that since the maximum performance available 206, the maximum performance, which can be set when a request for storage set-up is received, is B. Accordingly, the storage with storage ID 1 cannot satisfy the performance requirement.

Subsequently, when it is determined from the result of checking in step 301 that the other set-up should be created, the proposed set-up is initiated to get the storage set-up information instead of the user's requirements (step 302). This process of creating the proposed set-up is described in detail later step 302).

After step 302 has been finished, the Proposed Storage Set-up Menu 500 shown in FIG. 5 appears (step 303).

The Proposed Storage Set-up Menu 500 is used to present the information stored in the Proposed Storage Set-up Table 510 shown in FIG. 3, from which the user can select the desired data and each entry of the Proposed Storage Set-up Table 510 corresponds to one line in the menu the values for individual fields in the Proposed Storage Set-up Table 510 have been stored in step 302.

To select the Proposed Storage Set-up Menu 500, the user clicks on the Select button 1517 for marking. This operation enables the select flag for the entry corresponding to the menu selected by the user to be set to ON.

The Proposed Storage Set-up Menu 500 contains the Confirm button 518 and the Cancel button 519.

Selecting the Confirm button 518 by the user allows the proposed set-up to be set considering storage requirements specified in a menu line. Selecting the Cancel button 519 cancels the selection that the proposed set-up registered in the Proposed Storage Set-up Table 510 is implemented.

When the Confirm button 518 is selected, the proposed set-up is created, while when the Cancel button 519 is selected, the process exits without creating the proposed set-up.

Next time when creating the proposed set-up, the system checks the "negotiation with other user" 515 field in the Storage Set-up Table corresponding to the selected Proposed Storage Set-up Menu to see if other user s set-up should be changed (step 305).

If other user's set-up should be changed, the system initiates the negotiation with the user about modification to the existing set-up (step 306).

The process of negotiation with other user is described in detail later.

The system determines whether or not the negotiation with other user has been successfully finished (step 307). In this case, the negotiation process in step 306 involves description of data indicating whether or not the negotiation has been successfully finished into the negotiation with other user 515 field in the Proposed Storage Set-up Table 510.

If the negotiation process failed, the proposed set-up is invalidated and the control of workflow returns to step 304. When returning to step 304, after that the proposed set-up has been invalidated in the Proposed Storage Set-up Table 510 is verified, it is informed to the user that the previous proposed set-up cannot be selected by indicating "Invalid" in the 1515 field, which specifies whether or not the negotiation with other user is required, or by deleting the proposed set-up selected by the user.

If the negotiation with other user has been successfully finished (step 307), first, the storage set-up for the negotiated user is changed (step 308) to set the storage set-up for the requesting user. The data to be changed here have been pre-determined in steps "creation of proposed set-up" (step 302) and "the negotiation process" (step 306).

After the process in step 308 has been finished, if the user's requirements are received in step 301 or the proposed storage set-up selected in the Proposed Storage Set-up Menu 500 by the user in step 305 requires no negotiation with other existing user, the storage-set-up selected by the user is implemented and it is informed to the user that the set-up has been successfully finished (step 309).

In step 309, the system presents the Storage Set-up Notification Screen 600 shown in FIG. 7 to the user indicating that the storage set-up has been successfully finished. This means that the information displayed on the Storage Set-up Notification Screen 600 is a reply to the request specified in the Storage Set-up Screen 400. The system indicates data set in the performance 601 and capacity 602 fields and if the proposed set-up is different from that requested by the user, informs the user of it. The data in the price 603 field in the proposed set-up is displayed.

To accept the data displayed on the screen, the user clicks on the Confirm button 604.

Note that although the first prerequisite is to determine whether or not the user's requirements should be satisfied when the proposed storage set-up is created in step 301 in the flowchart shown in FIG. 3, the system may recommend and present to the user its desired, proposed set-up with the discount service added.

For example, the process, which the recommended, proposed set-up is introduced for the storage system, which the SSP wants to have the user to use because current status of storage usage shows a disproportionate occupation, may be added to step 301. In addition, by saving the information in the Storage Information Table 200 regularly, historical storage information may be kept to present the proposed set-up based on the usage of storage by referencing the historical information. For example, to have the user to use the storage, of which usage is low by referencing the historical information, the proposed set-up for the storage may be presented to the user.

(III-2) Details of Process for Creating Proposed Storage Set-Up

Subsequently, the process for creating the proposed set-up in step 302 above-mentioned is described based on the flowchart shown in FIG. 8.

Figure 8:
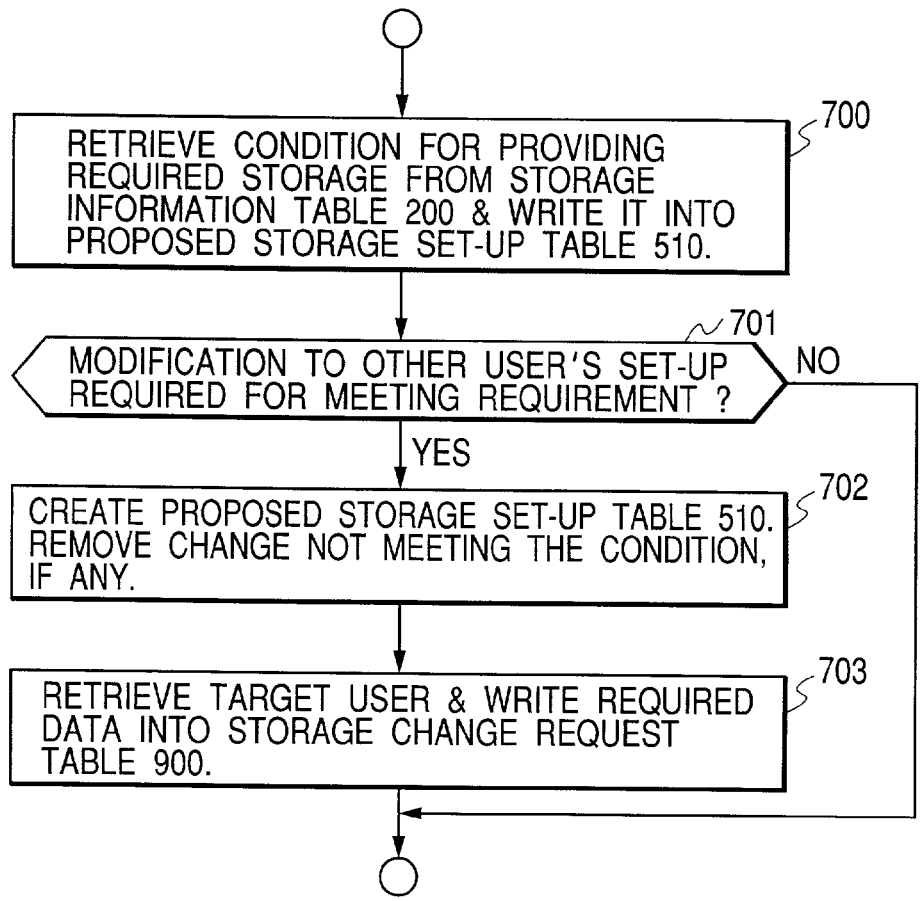
FIG. 8 is a flowchart showing a procedure, in accordance with which the system creates a proposed storage set-up.

FIG. 8 is a flowchart showing the procedure for the system to create the proposed set-up.

In the process for creating the proposed set-up, if the administrative computer 100 determines that no storage satisfying the user's requirements exists, any other proposed set-up is created instead of that set-up.

First, the system searches the Storage Information Table 200 for any requested storage capacity, which can be provided to the user, and writes the result in the Proposed Storage Set-up Table 510 (step 700).

In the example Storage Information Table 200 shown in FIG. 2, three storages have been registered; all the data in the maximum performance available 206 field of the storages are B, the free space 203 field depends from storage to storage, and the storage ID 201 field indicates the maximum value because the free space of the storage with ID 1 is 500G.

In this embodiment, since each of disks has up to 500G capacity, the process for creating the proposed set-up is described assuming that only one volume out of one storage is set. In the example shown in FIG. 2, when the user may want to set more than one volume, up to 585G may be registered because the sum of the values in the free space 203 fields is 585G.

Supposing that the requirements are submitted by the user as shown in the Storage Set-up Screen 400 in FIG. 5. In this case, since the storage with ID 1 cannot satisfy the requirement: A in the performance 401 field but satisfy the requirement: B in the capacity 403 field, the system registers a candidate proposed set-up sensitive to the storage with ID 1 in the Proposed Storage Set-up Table 510.

At registration, the entry ID 510, performance 512, and capacity 513 fields contain "1", "B", and "100G", respectively. Base on the Storage Price Adjustment Table shown in FIG. 2, the price is adjusted and then registered in the price 514 field. In this case, since performance has deteriorated, a 50% discount is applied (100G×100[month/G])×50% and the value of ¥5000/month is calculated.

In this case, since no negotiation with other user is required, "no" is registered in the "negotiation with other user 515 field. In the comparison with requirement 516 field, A is registered for the requested performance and B for the performance of the proposed set-up.

Subsequently, to satisfy the user's requirements, the system determines whether any change to the other user's set-up allows the system to satisfy the requesting user's requirements (step 701).

If possible, to request the target existing user to make a change to his/her set-up, the proposed change request is created based on the Volume Information Table 210 and stored in the Storage Change Request Table 910 described in FIG. 3.

For example, if the Storage Information Table 200 indicates that the user requests 600 G space of the storage with performance A, the change request is issued to the user using the storage with ID 1 registered in the Volume Information Table 210.

In addition, in the requirements for the storage shown in FIG. 5, since the user requests A but the current performance of the storage with ID 1 is B, it is possible to issue the change request to the user using the storage with ID 1 to make negotiation about relocation to other storage. The administrative module 110 shown in FIG. 1 controls access to volumes because a decrease in the users using storages improves storage performance.

The information in the change request specified by the system has been stored in the Storage Set-up Change Request Table 800 described in FIG. 3

As already explained, the Storage Set-up Change Request Table 800 defines "discount/month" 802 and "rules" 803 if the set-up is changed with respect to "changes" 801.

In the example shown in FIG. 3, three kinds of fields, "relocation", "capacity", and "performance" in relation to changes to the storage state, for which different discount prices are defined. The discount/month means the compensation for acceptance of change by the user and may motivate the users to change the storage set-up when indicated.

The system checks the result in step 701 and exits the process if no change request need to be issued to any other user.

If a change request should be issued to any other user, the proposed set-up is created and stored in the necessary fields of the Proposed Storage Set-up Table 510 (step 703). At this time, a "required" value is stored in the "negotiation with other user" 515 field.

In this case, if any condition is specified in the rules 803 field, the proposed set-ups, which do not satisfying the condition, are deleted from the Proposed Storage Set-up Table 510, if any. For example, if "relocate" is set in the changes field, the rule that the target storage must have the same performance as that of the existing storage is applied.

Thus, the system always grasps current status of the storages and when the user issues the storage set-up request, searches for and presents the proposed set-up, which is the next best one, to the user even if current status of the storages does not satisfy the user's requirements as they were. This enables the system to promote the usage of storages, prevent losses from incurring due to failure to satisfy the user's requirements, and attract the new customers, resulting in stable SSP businesses.

(III-3) Details of the Process for Making Negotiation with other User for Storage Set-Up Subsequently, the details of the process for making negotiation with any other user for storage set-up in step 306 mentioned above are described based on the flowchart in FIG. 9 by referencing FIG. 10.

Figure 9:
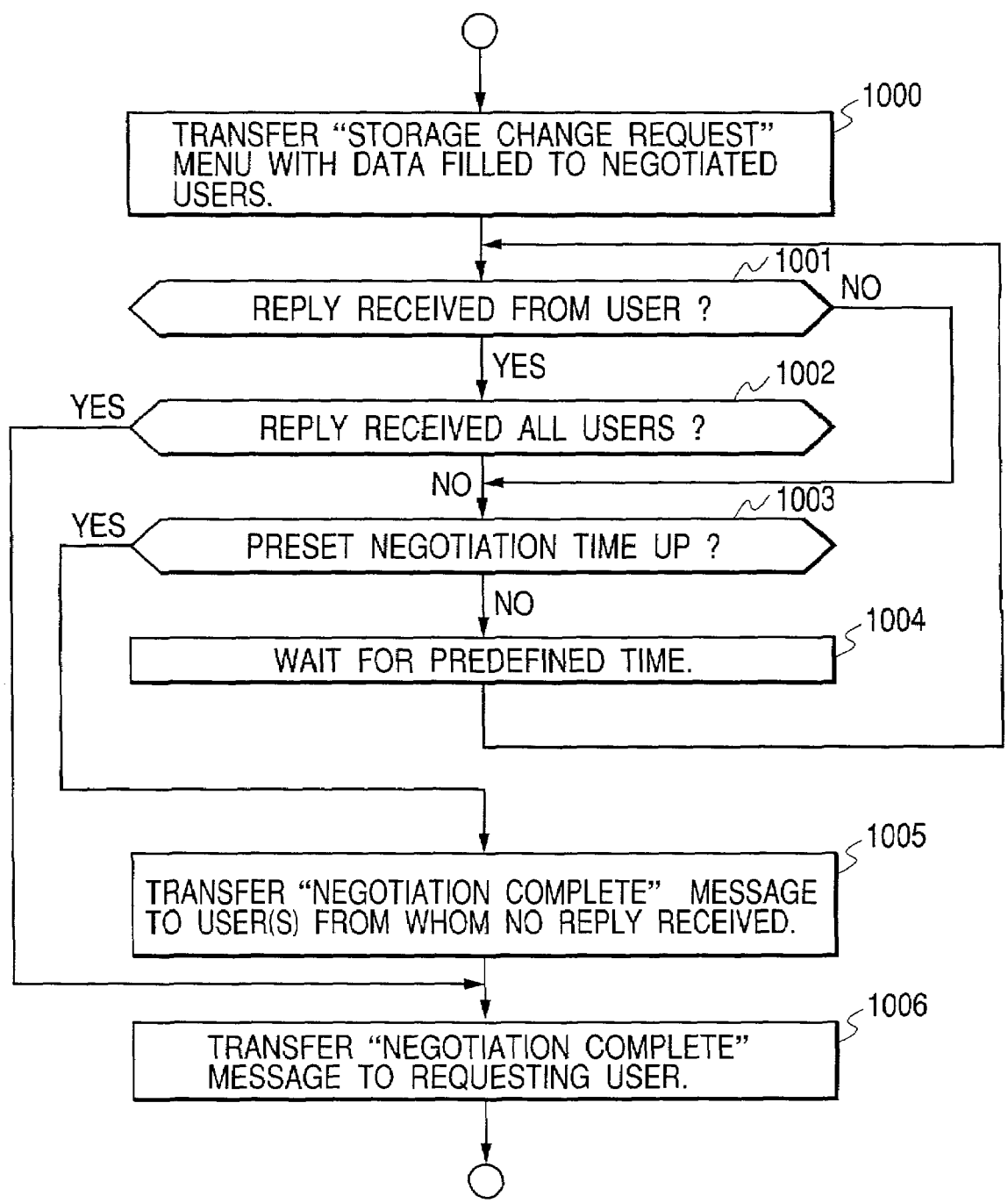
FIG. 9 is a flowchart showing a procedure for negotiating with other users to modify the storage set-up.

FIG. 9 is a flowchart showing the procedure for making negotiation with any other user about storage set-up change to set the storage mentioned above.

FIG. 10 is a schematic drawing showing the Storage Change Request Menu.

To set the storage requested by the user, when making negotiate with the target user about storage change, the system presents the Storage Change Request Menu 900 shown in FIG. 10 on the display screen of the computer used by him/her (step 1000).

To achieve this, the system searches the Volume Information Table 210 for the user using the storage to be changed and presents the Storage Change Request Menu 900 to the target user.

The Storage Change Request Menu 900 is the menu used by the user to select any of practical conditions for storage change, which are displayed based on the information stored in the Storage Change Request Table 910.

For the user to select the entries, about which he/she agrees, the Storage Change Request Menu 900 indicates changes in capacity and performance, and the yes or no value for user volume relocation, changed price, and discount price for compensation for change in the fields as conditions.

To accept the proposed storage change, the user clicks the Select button 1917 for marking and then the Confirm button 918.

This informs the administrative computer 100 of the change request and the select flag is set to ON in the Storage Change Request Table 910. At the same time, "success" is registered in the required 515 field of the Proposed Storage Set-up Table 510 and then displayed in the "negotiation with other user required?" field on the screen shown in FIG. 6 as well.

To reject all the proposed storage changes, the user clicks the Request Reject button 920. This informs the administrative computer 100 of rejected change and the select flag is set to OFF in the Storage Change Request Table 910. At the same time, "fail" is registered in the required 515 field of the Proposed Storage Set-up Table 510 and then displayed in the "negotiation with other user required?" field on the screen shown in FIG. 6 as well with concerned entries deleted.

In the proposed storage change for the example storage with ID 2 shown in FIG. 10, capacity is "100G, not changed" but performance is "A (performance guarantee)→B (performance guarantee)", indicating that the performance is lowered. Relocation to another volume is "no".

In this case, since the user uses 50G of storage space for ¥100 (month/G) and a scale factor for performance guarantee is 1.5 times based on Storage Performance Guarantee Price Table 240 shown in FIG. 2, the new price can be calculated by the expression 50G×¥100 [month/G]×1.5, ¥7500/month.

Since only performance is changed, a discount "−¥150"/month is applied based on the Storage Change Request Table 910 shown in FIG. 3.

Subsequently, the system determines whether or not the user sends a notification (step 1001).

If no notification is sent, the system determines whether or not the pre-determined negotiation time is up (step 1003). If the time is not up, the system waits for a given time (step 1004) and then receives the notification from the user again.

When the notification is received from the users, the system checks to see if the users have sent the notification (step 1002) and if not so, initiates the process for determining whether the pre-determined negotiation time is up in step 1003.

If all the users have not always sent the notification, the system determines whether or not the pre-determined negotiation time is up (step 1003), waits for a given time if the time is not up (step 1004), and waits for the notification from the users again.

If all the users have not always sent the notification and the pre-determined negotiation time is up, the system sends the notification to the users, from whom the system have not received the notification indicating that the pre-determined negotiation time is up (step 1005).

If all the users have sent the notification and the pre-determined negotiation time is up, the notification indicating that the negotiation process has been finished is not issued.

In addition, the system informs the user requesting the set-up change of the negotiation process completed (step 1006).

If the negotiation has been successfully finished, the system proceeds to step 308 in the flowchart of FIG. 3, and first, the storage, about which the negotiation has been successfully finished, is set based on the Storage Change Request Table 910. Then, in the next step 309, the user checks and selects the set-up of the storage, about which the negotiation has been successfully finished, in the Proposed Storage Set-up Menu 500. This allows the user requesting the storage space to enjoy the storage service.

Thus, since the storage can be changed by making negotiation with other existing user even if a storage setup change request is received and current status of storages cannot satisfy the user's requirements, the conditions for using the storage satisfying new users can be presented. This improves the customers' satisfaction, leading to a higher possibility for getting new customers.

The existing users may agree with the system about the negotiation if they have no difficulty when the conditions for using the storage are changed to share in a privilege of discount, resulting in a economical merit.

From the standpoint of making full use of system resources, the system can be efficiently used as a whole by providing the storage service to the users, who want to use the storages truly, for reasonable prices, ensuring appropriate profits.

As mentioned above, in the first embodiment, when the storage request is received from the user, the SSP presents the next-best proposed set-up satisfying partially user's requirements even if current status of storages cannot satisfy the user's requirements. If required, the system makes negotiation with other user about storage change to satisfy the requirements by the user requesting the storage set-up.

For this reason, it is expected that the users can accept the proposed storage set-up and has many chances for using the storage, which may result in acquisition of new customers and improvement in customers' satisfaction. Moreover, the existing users also have chances for reviewing their own storages to reduce the unwanted space or lower their performance, to which a discount is applied, achieving an economical merit.

The SSP can not only acquire new customers and improve the customers' satisfaction but also can use its own storages efficiently.

EMBODIMENT 2

The second embodiment of the present invention is described below based on FIG. 11-FIG. 13.

Figure 11:
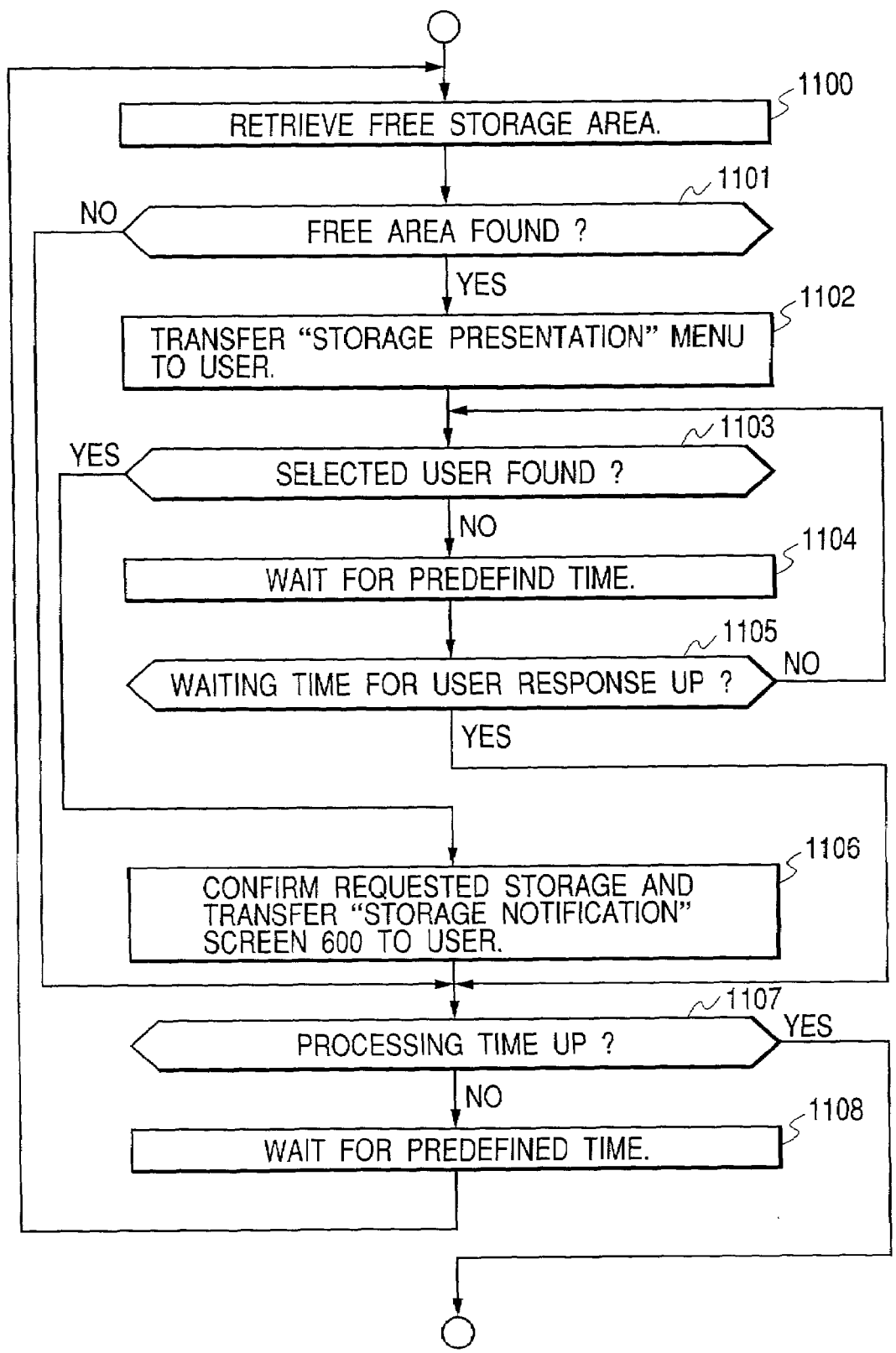
FIG. 11 is a flowchart showing a process for presenting storage service products according to the second embodiment of the present invention.

FIG. 11 is a flowchart showing the process for presenting storage service products according to the second embodiment of the present invention.

FIG. 12 is a schematic drawing showing the structure of the Storage presentation Table.

FIG. 13 is a schematic drawing showing the Storage Presentation Menu.

The embodiment is based on the same idea as that of the first embodiment in that the storages are rented to the users depending on the system configuration shown in FIG. 1 with a difference in the relationship between the users and the SSP.

In the first embodiment, the user requests the storage set-up with certain requirements and the SSP creates the proposed storage set-up in response to it.

The embodiment relates to the method for providing the storage service, in which the SSP actively presents the proposed storage set-ups as the service products to the users and the users subscribe to the desired ones among service products.

The process for presenting the storage service products according to the second embodiment of the present invention is described below based on FIG. 11.

First, the administrative computer 100 search the Storage Information Table 200 for any free spaces of the storages (step 1100). It checks to see if free spaces exist (step 1101) and if any spaces are found, examines the performance of the free spaces based on the Volume Information Table 210 and stores the information in the fields into the Storage Presentation Table 1210.

Subsequently, it creates the Storage Presentation Menu 1200 using the information from the Storage Presentation Table 1210 and presents it to the users (step 1102).

Both the Storage Presentation Table 1210 and the Storage Presentation Menu 1200 are described later.

The system checks to see if the user has selected the Storage Presentation Menu 1200 (step 1103).

If no user has selected the menu, it waits for a predetermined time (step 1104), checks to see if the waiting time for user selection is up (step 1105), and if the time is not up, returns to step 1103.

If some user has selected the menu, executes storage set-up based on the information in the selected presentation menu, and presents the Storage Set-up Notification Screen 600 to the user for notification (step 1106).

If no free spaces are found in step 1101, or the waiting time for user selection is up in step 1105, the system checks to see if the time for storage presentation is up (step 1107), and if the time is up, exits the whole process.

If the time is not up, it waits for a pre-determined time (step 1108), returns to step 1100, and checks to see if any free spaces exist. Note that the time for storage presentation to the users should be adjusted by the administrative computer 100 to prevent the storage set-up concerned from being changed.

The Storage Presentation Table 1210 is described below based on the FIG. 12.

The Storage Presentation Table 1210 is the table used to contain the data for presenting storage assignment as one of service products.

Assuming that one entry in the table corresponds to one service product, the fields of the table include a product name 1211, which is the identifier of the product, a performance 1212 and capacity 1213, which are parts of the storage set-up in the second embodiment of the present invention, and a price 1214 calculated from the set-up data based on the Storage Performance Price Table 230.

In addition, the table contains additional fields, remarks indicating comments to the users and a select flag to be set when the user selects a given field.

The Storage Presentation Menu 1200 is described below based on FIG. 13.

The Storage Presentation Menu 1200 is the table based on the information in the Storage Presentation Table 1210 to present the service products so that the users can select any of them for purchasing.

As shown in FIG. 13, the Storage Presentation Menu 1200 contains a product name 2211 field, performance 2212 and capacity available 2213 fields related to the 2211 field. The performance 2212 field specifies the information indicating that performance guarantee is added or how level of standard performance is provided as for product 1. The capacity available 2213 field specifies the capacity and unit, which the users are available. The example given in FIG. 13 shows that 20G of capacity is available for product 1 and 10-50G is available for product 3 in step of 10G.

A price 2214 field specifies the price for the service product.

A remarks 2215 field specifies the characteristics and sales points for the service product to make an appeal to the users for sales promotion.

For example, with respect to product 2, its performance has deteriorated but its standard storage performance is ranked A. The price for the storage has been set to that for the storage ranked B. Even if the price is ranked up to A, such information can be displayed in the remarks 2215 field that the users can enjoy economical benefits regardless of a rise in price because the existing price would be kept as it is for a given period.

Moreover, giving another example of storage C, the administrative computer 100 checked to see if the storage had been ever used by referencing its historical information and determined that its usage was low. The historical storage information may be contained in the Storage Information Table shown in FIG. 2 by adding one field or may create a new Storage Historical Table to describe the information.

In this case, the SSP indicates the information in the remarks 2215 field that a discount is applied as shown for product 4 given in FIG. 13, for example for sales promotion of the storage.

To purchase any of the service products presented in the Storage Presentation Menu 1200, the user clicks on a Select button 2216 and then a Submit button 2217 to inform the administrative computer 100 of it.

Thus, according to the second embodiment, the SSP can check for any free spaces regularly to present the storage service products, if found, at any time, depending on the result of checking, attracting new customers and promoting the usage of storages by the existing customers.

Alternately, the SSP may present the Storage Presentation Menu 1200 to the users for sales promotion of storages if it is determined that the usage tends to increase when current status of usage for each of computers 10*a*, 10*b*, . . . ,10*n* is monitored for grasping the users' tendency.

For the storages with a file system, such as a NAS (Network Attached Storage), the administrative module 110 specific to the storage may be used because it can grasps current status of usage for the storage.

Alternately, it may be possible that the administrative module 110 monitors the number of times the users have access and if a large increase in the number is detected, presents the Storage Presentation Menu 1200 to the users at a regular interval of hours to make a sale campaign of the service products, for which accesses to related storages are made less frequently, promoting users' transition to another storages.

[Method of Operating the Other System]

Finally, the method of operating the other system than those shown in embodiments 1 and 2 mentioned above is described based on FIG. 14.

Figure 14:
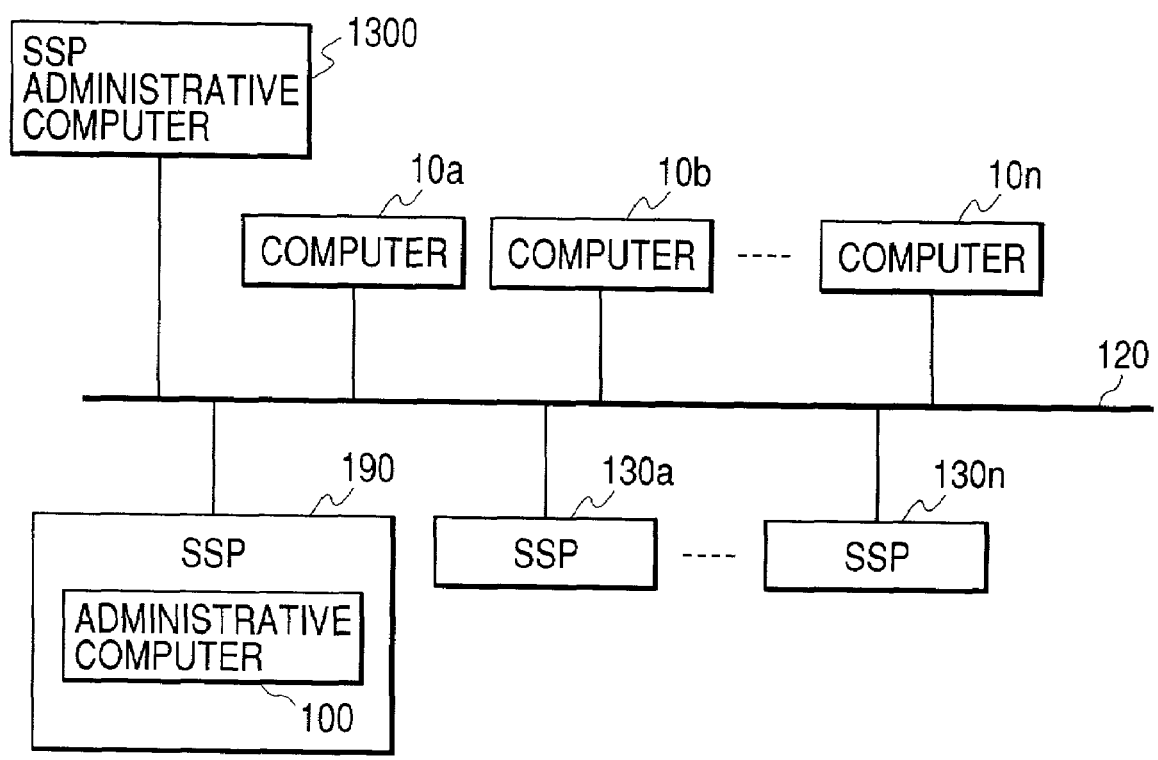
FIG. 14 is a view showing a configuration of another storage operational system of the present invention.

FIG. 14 is a view showing a configuration of the other storage operational system of the present invention.

In the configuration shown in FIG. 14, multiple similar SSP systems 130*a*, 130*b*, . . . 130*n* are provided in addition to the SSP's Storage Operational System 190 and a integrated administrative computer 1300, which manages the information on all of said SSP systems, has been incorporated to enable the multiple SSP systems to be operated simultaneously by grasping current status of the SSP's Storage Operational System and all of other SSP systems.

[Effects of the Invention Known from Embodiments]

According to the invention, the storage operational system and the method of providing the storage rental services can be provided, which allow the SSPs not only to satisfy a wide range of users' requirements while coping with any change in current status of storage usage for improving customers' satisfaction, but also to promote effective operation of the SSP systems.

What is claimed is:

1. A storage operational system for administrating computers and storage devices connected to the computers comprising:

a means for getting information on current status of storage usage of said storage devices;

a means for getting users' set-up requirements for said storage devices;

a means for creating proposed set-ups for storage spaces on said storage devices based on said set-up requirements by the users and said information on current status of storage usage of said storage devices;

a means for setting prices to be charged to the users for said created proposed set-ups of said storage spaces on said storage devices;

a means for the users to select any of said created, proposed set-ups of said storage spaces on said storage devices;

a means for setting said storage spaces on said storage devices depending on the selection; and a means for presenting next-best proposed set-ups for partially satisfying users' requirements for storage devices set-ups even if all of said users' requirements are not satisfied, wherein said storage operational system comprises:

a means for negotiating with other users, which already have assigned storage devices, about conditions for using the storage devices to change set-ups for said storage devices assigned to said other users;

a means for changing said set-ups of said storage devices assigned to said other users based on the result of the negotiation; and a means for applying discount prices for usages of said storage devices of said other users when they are rented to users issuing set-up requirements.

2. A method for providing the storage rental services for the storage operational system, which administers the computers and the storage devices connected to the computers, comprising the steps of:

getting information on said current status of storage usage of said storage devices;

getting the users' set-up requirements for said storage devices;

creating proposed set-ups for storage spaces on said storage devices based on said set-up requirements by the users and said information on current status of storage usage of said storage devices for presenting to the users;

setting prices to be charged to the users for the said created proposed set-ups of said storage spaces on said storage devices;

making the users select any of said created, proposed set-ups of said storage spaces on said storage devices; and setting said storage spaces on said storage devices depending on the selection, wherein next-best proposed set-ups partially satisfying said users' requirements for set-ups are created by following said procedure for creating proposed set-ups if all of said requirements cannot be satisfied, and are presented to the users, and wherein said method comprises the steps of:

negotiating with other users, which already have assigned storage devices, about modification to the use conditions for storage devices assigned to them to change the set-ups for said storage devices assigned to such other users;

changing the set-ups for storage devices assigned to the other users depending on the result of the negotiation; and applying discount prices for the usages of said storage devices by users issuing set-up requirements based on the change to the set-ups of the other users.

* * * * *